(12) United States Patent
Sullivan et al.

(10) Patent No.: US 10,896,462 B2
(45) Date of Patent: Jan. 19, 2021

(54) SYSTEM AND METHOD FOR AGGREGATING AND ANALYZING FINANCIAL DATA

(71) Applicant: FinancialApps, LLC, Fort Lauderdale, FL (US)

(72) Inventors: Robert Sullivan, Fort Lauderdale, FL (US); Eduardo Gonzalez, Homestead, FL (US)

(73) Assignee: FINANCIALAPPS, LLC, Fort Lauderdale, FL (US)

( * ) Notice: Subject to any disclaimer, the term of this patent is extended or adjusted under 35 U.S.C. 154(b) by 12 days.

(21) Appl. No.: 16/503,860

(22) Filed: Jul. 5, 2019

(65) Prior Publication Data

US 2019/0333140 A1    Oct. 31, 2019

Related U.S. Application Data

(63) Continuation-in-part of application No. PCT/US2018/012682, filed on Jan. 5, 2018.
(Continued)

(51) Int. Cl.
*G06Q 40/02* (2012.01)
*G06Q 40/00* (2012.01)
*G06F 16/242* (2019.01)

(52) U.S. Cl.
CPC ........... *G06Q 40/02* (2013.01); *G06F 16/244* (2019.01); *G06Q 40/128* (2013.12)

(58) Field of Classification Search
CPC ..... G06F 16/244; G06Q 40/02; G06Q 40/128
See application file for complete search history.

(56) References Cited

U.S. PATENT DOCUMENTS

2002/0059107 A1* 5/2002 Reich ................... G06Q 40/00
                                                                   705/26.1
2008/0140684 A1* 6/2008 O'Reilly ............... G06F 16/353

FOREIGN PATENT DOCUMENTS

WO    WO-03001866 A1 *  1/2003  ......... G06Q 20/4037

OTHER PUBLICATIONS

Paymetric: Introduction to Payment Card Processing in SAP, 2014, pp. 1-13. (Year: 2014).*
(Continued)

*Primary Examiner* — Bijendra K Shrestha
(74) *Attorney, Agent, or Firm* — Johnson & Martin, P.A.; James David Johnson

(57) ABSTRACT

A computer-implemented system for aggregating and analyzing financial and other data for creating reports and decisions in real-time is provided. The system includes a first computer for sending an order, a server for receiving the order and sending an order communication, a second computer for receiving the order communication and transmitting account information, and an account server having at least one non-relational database containing transaction data related to a requester. A data relevancy engine operable on the server aggregates, analyzes, and performs calculations using the transaction data to generate reports based on one or more rules or rulesets. Each rule is created via a relational query directed at at least one of the one or more non-relational databases or at other existing rules. The system also provides an approved determination or a denied determination in response to a request for credit, other financing, a new account, insurance, or a lease.

20 Claims, 3 Drawing Sheets

Related U.S. Application Data

(60) Provisional application No. 62/442,627, filed on Jan. 5, 2017.

(56) References Cited

OTHER PUBLICATIONS

EY GM Limited: Big data: Changing the way businesses compete and operate, Apr. 2014, pp. 1-32. (Year: 2014).*
DemandZen: 7 Reasons Why Relevant Data is Important to Your Organization, May 18, 2017, pp. 1-5 (Year: 2017).*

* cited by examiner

FIG. 2A

| NAME | DESCRIPTION | TYPE |
| --- | --- | --- |
| Ability to Repay Matrix | Calculates a suggested matrix of the customer's ability to repay. | Attribute |
| Account Summary | Provides a summary overview of the meta data associated with the account. | Process |
| ACH ins | Identifies ACH IN transactions. | Identify |
| ACH outs | Identifies ACH OUT transactions. | Identify |
| Adjusted Cashflow Matrix | This rule calculates cashflow based on qualified payroll transactions against all outflows over given time intervals. | Attribute |
| Asset Summary | Provides a summary of assets and compares what was requested in the order versus what was retrieved in the account pull. | Process |
| Average Balances | Calculates average balances per account, carried over a given time frame. | Attribute |
| Balance Trends Matrix | Counts the number of occurrences a balance falls below a specified balance threshold. | Identify |
| Cashflow Matrix | Calculates cashflow based on all inflows against all outflows over given time intervals | Attribute |
| Depletion Matrix | Calculates the rate at which the average paycheck amount is depleted. | Attribute |
| Deposit History | Identifies all deposit transactions across all asset accounts. | Identify |
| Deposit Matrix | Calculates the number of deposits, the average amount and the total income over given time intervals | Attribute |
| Deposit Summary | Identifies the highest, lowest, and average deposits over a given time frame. | Identify |
| End of Day Balances | This rule will calculate the end-of-day balance of an account within a given time frame. | Attribute |
| Insufficient Funds | Identifies the number of non-sufficient fund occurrences over a given time frame. | Identify |
| Negative Occurrences | Identifies the number of end of day balance occurrences below zero. | Identify |
| Negative Occurrences Matrix | Identifies the number of end of day balance occurrences below zero over given time intervals | Identify |
| Paycheck Summary | Identifies and Calculates payroll transactions to provide average, total, and most recent paycheck amounts. | Attribute |
| Payroll Matrix | Calculates over the payroll transactions to determine the number of paychecks, the average amount and the total amount over given time intervals | Attribute |

FIG. 2B

| Payroll Transactions | Identifies potential Payroll Transactions | Identify |
|---|---|---|
| Process Dates | This verifies the history on the account used for the integrity of the data for the product ordered | Process |
| Process Orders | Process all parameters of the given order. | Process |
| Tags | Identifies transactions and generates various alert tags. | Identify |
| Transaction History | Identifies all transactions per asset account. | Identify |

SYSTEM AND METHOD FOR AGGREGATING AND ANALYZING FINANCIAL DATA

CROSS REFERENCE TO RELATED APPLICATIONS

This application is a bypass continuation-in-part application of and claims priority from international patent application number PCT/US2018/012682 filed on Jan. 5, 2018, which claimed priority to U.S. provisional patent application Ser. No. 62/442,627 filed on Jan. 5, 2017. The foregoing applications are incorporated in their entirety herein by reference.

FIELD OF THE INVENTION

The invention relates to systems and methods for aggregating and analyzing data. More particularly, the invention relates to computer-implemented systems and methods that utilize a data relevancy engine for building rulesets and analyzing, performing calculations, and preparing reports based on financial or other data aggregated by the system to make real-time decisions concerning approval or denial of credit, loans, mortgages, other financing, investment management, new account openings, insurance, and leases.

BACKGROUND

The financial industry collects vast amounts of data related to consumers and their finances. Many conventional software applications for aggregating and analyzing financial data are incapable of quickly and efficiently performing those processes on such vast amounts of data to provide real-time data analysis and analytical results that permit accurate and fast credit decision-making and investment management in relation to requests from consumers for credit, loans, mortgages, other financing, and new account openings.

Similar analyses are required in the healthcare and housing industries when decisions need to be made quickly concerning eligibility for or approval of requests from consumers concerning insurance and leases or even requests for service without pre-payment.

A need exists for software applications capable of aggregating and analyzing large, complex datasets contained in non-relational databases in real-time to allow a lender or investment manager to make decisions related to credit granting and investment management also in real-time. A need also exists for securely and quickly obtaining access to or copies of transaction data from third parties, such as financial institutions, for aggregation and analyses to generate reports that render determinations concerning approval or denial of a consumer's or business's request for credit, loans, mortgages, other financing, investment management, a new account, insurance, or a lease.

SUMMARY

The invention relates to a computer-implemented system for aggregating and analyzing financial and other data for creating reports and decisions in real-time. The system includes a first computer for sending an order, a server for receiving the order and sending an order communication, a second computer for receiving the order communication and transmitting account information, and an account server having at least one non-relational database containing transaction data related to a requester. A data relevancy engine operable on the server aggregates, analyzes, and performs calculations using the transaction data to generate reports based on one or more rules or rulesets. Each rule is created via a relational query directed at at least one of the one or more non-relational databases or at other existing rules. The system also provides an approved determination or a denied determination in response to a request for credit, other financing, investment management, a new account, insurance, or a lease.

The relevancy data engine includes an integrated development environment platform that provides for business analysts, data analysts, data scientists, and other users of an interface to write, develop, test, optimize and debug rulesets. Each ruleset or rule is a collection of one or more pipeline stages. A pipeline stage can query databases, request other rules to be processed, or request JavaScript functions to be processed. Each rule can include one or more queries directed at at least one of the one or more databases or at one or more rules.

The systems and methods described herein are useful for the financial industry, including banks and investment firms, for creating and analyzing budgets, cash flow, and categorization and in lending for performing instant account verification, determining a consumer's average balances, and alerting the user to non-sufficient funds when a particular consumer has insufficient funds. The system can also be used in wealth management for ROI (return on investment) projections and other investment analyses. The systems and methods described herein also may be used to track and analyze debt payoff and spending, to determine fraud risk scores, and to monitor suspicious or fraudulent activity related to consumers or lenders. These systems and methods are useful for performing asset verification for use in mortgage lending, marketplace lending, installment loan lending, auto lending, lending for investment purposes, for small business lending, in the rental industry to determine qualifications for renting, and for new financial account opening.

In addition, the systems and methods described herein may be used in the healthcare industry for patient financial clearance where the provider needs to verify a patient's ability or inability to pay in real-time for purposes of making a decision at the point of service concerning the provision of healthcare services to a particular patient.

The systems and methods described herein may also be used in the housing industry, for example, for making determinations in providing disaster relief and housing subsidies, where the provider needs to verify an individual's ability of inability to pay in real-time for purposes of making a decision at the point of service concerning the granting of housing disaster relief after a disaster such as a hurricane or concerning the granting of housing subsidies to an individual seeking such assistance.

The systems and methods described herein provide several advantages over conventional data aggregation and analysis systems in that they provide real-time data analysis and results in relation to complex datasets, increase data analysis capacity, and provide an improved initial product development process and permit the marketing of such products to be initiated more rapidly than in the past. Another advantage of these systems and methods is that ongoing development and maintenance of the systems is improved in the financial technology industry. Still another advantage of the systems and methods described herein is that they permit the creation of dynamic application program interface (API) endpoints, which is a relevancy data engine architectural concept that allows each rule created to be accessed as an API endpoint to facilitate processing of rules and workflows that leverage the rules in real-time. Yet another advantage of the systems and methods described herein is that they are useful for performing data calculations and transformations in addition to applying complex business, financial, and accounting methodologies, logic, and use-case scenarios.

Yet another advantage of the systems and methods described herein is their ability to render and assist in making decisions in response to requests in real-time so that lenders, landlords and lessors, health care providers, insurers, and other users may quickly and efficiently process request for credit, loans, mortgages, other financing, investment management, new account openings, healthcare services, other services, insurance, and leases. Still another advantage of these systems and methods is their ability to aggregate, analyze, and perform calculations using transaction data obtained from third parties such as banks and brokerages to generate reports containing financial decisions for the user with respect to the requester's request.

Accordingly, the invention features a computer-implemented system for aggregating and analyzing data contained in a database using relational data queries to create reports and to generate decisions in real-time. The system includes a first computer having a processor and associated memory. A user portal is accessible on the first computer. The system also includes a first display communicatively connected to the first computer. The system also includes a first server that includes a new order process and a relevancy data engine, wherein the new order process sends an order communication. The system also includes a second computer for receiving the order communication from the first server. The second computer includes a processor and associated memory. A requester portal is accessible on the second computer. The system also includes a second display communicatively connected to the second computer for viewing the order communication. The system also includes a communications network for communicatively connecting the first computer and the second computer to the first server. The order communication is selectable to access the requester portal on which account information of a requester is inputtable and transmittable as a request. The relevancy data engine transmits the account information to at least one account server to access transaction data stored in one or more databases on at least one account server. The transaction data is related to the requester whose account information was input into the requester portal. The relevancy data engine connects to the at least one account server via the communications network or via a second communications network and produces a report that is or includes an approved determination or a denied determination in response to the request. The relevancy data engine aggregates and analyzes transaction data stored in the one or more databases to produce the report according to a rule. The relevancy data engine also transmits the report to the first computer for viewing on the first display.

In another aspect, the invention can feature the report further including financial data and results of calculations performed by the data relevancy engine by aggregation and analysis of the transaction data.

In another aspect, the invention can feature the at least one account server being or including a financial institution server owned, operated, or controlled by a financial institution. The at least one account server can include an authentication and security process to authenticate that the request received by the at least one account server is from the first server before access to the transaction data is granted to the first server by the at least one account server.

In another aspect, the invention can feature the rule being or including a single rule, a ruleset that includes more than one rule, or a pipeline stage.

In another aspect, the invention can feature the one or more databases on the at least one account server being non-relational databases.

In another aspect, the invention can feature the account information being or including an account number or other account-identifying information related to a checking account, savings account, brokerage account, retirement account, loan, mortgage, margin account, credit card account, or other type of financial account of the requester.

In another aspect, the invention can feature the transaction data being or including records of credits and debits related to one or more accounts, which are stored in the one or more databases on the at least one account server.

In another aspect, the invention can feature the request being or including the requester's request for credit, a loan, a new financial account, insurance, or a lease.

In another aspect, the invention can feature the rule being or including a relational data query run by the data relevancy engine using transaction data, which is non-relational, obtained from the one or more non-relational databases stored on the at least one account server. The data relevancy engine aggregates, analyzes, and performs calculations using the non-relational transaction data to create a report and to make the approved determination or the denied determination in real-time in response to the request.

The invention also features another computer-implemented system for aggregating and analyzing data contained in a database using relational data queries to create reports and to generate decisions in real-time. The system includes a first computer having a processor and associated memory. A user portal is accessible on the first computer. The system also includes a first display communicatively connected to the first computer. The system also includes a first server that includes a new order process and a relevancy data engine, wherein the new order process receives an order from the first computer and sends an order communication. The system also includes a second computer for receiving the order communication from the first server. The second computer includes a processor and associated memory. A requester portal is accessible on the second computer. The system also includes a second display communicatively connected to the second computer for viewing the order communication. The system further includes at least one account server on which transaction data related to at least one account of a requester is stored in a database. The system also includes a communications network for communicatively connecting the first computer, the second computer, and the at least one account server to the first server. The order communication is selectable to access the requester portal on which account information of the requester is inputtable and transmittable as a request. The relevancy data engine transmits the account information to at least one account server to access the transaction data stored in one or more databases on the at least one account server. The transaction data is related to the requester whose account information was input into the requester portal. The relevancy data engine connects to the at least one account server via the communications network or via a second communications network. The relevancy data engine produces a report that is or includes an approved determination or a denied determination in response to the request. The relevancy data engine aggregates and analyzes transaction data stored in the one or more databases to produce the report according to a rule. The relevancy data engine transmits the report to the first computer for viewing on the first display.

In another aspect, the invention can feature the report further including financial data and results of calculations performed by the data relevancy engine by aggregation and analysis of the transaction data.

In another aspect, the invention can feature the at least one account server being remote from the first server on which the data relevancy engine is installed.

In another aspect, the invention can feature the rule being or including a single rule, a ruleset that includes more than one rule, or a pipeline stage.

In another aspect, the invention can feature the one or more databases on the at least one account server being non-relational databases.

In another aspect, the invention can feature the at least one account server being or including a financial institution server owned, operated, or controlled by a financial institution. The at least one account server can include an authentication and security process to authenticate that the request received by the at least one account server is from the first server before access to the transaction data is granted to the first server by the at least one account server.

In another aspect, the invention can feature the account information being or including an account number or other account-identifying information related to a checking account, savings account, brokerage account, retirement account, loan, mortgage, margin account, credit card account, or other type of financial account of the requester.

In another aspect, the invention can feature the transaction data being or including records of credits and debits related to one or more accounts, which are stored in the one or more databases on the at least one account server.

In another aspect, the invention can feature the request being or including the requester's request for credit, a loan, a new financial account, insurance, or a lease.

In another aspect, the invention can feature the rule being or including a relational data query run by the data relevancy engine using transaction data, which is non-relational, obtained from the one or more non-relational databases stored on the at least one account server. The data relevancy engine aggregates, analyzes, and performs calculations using the non-relational transaction data to create a report and to make the approved determination or the denied determination in real-time in response to the request.

The invention also features a method for aggregating and analyzing data contained in a database using relational data queries to create reports and to generate decisions in real-time. The method includes the steps of: (a) sending an order through a user portal accessible on a first computer, wherein the first computer includes a processor and associated memory, and wherein a first display is communicatively connected to the first computer; (b) receiving the order from the first computer on a first server via a communications network that communicatively connects the first computer and the first server, wherein the first server includes a relevancy data engine, and wherein the order includes contact means related to a requester; (c) sending an order communication via the communications network from the first server to the contact means provided in the order for the requester; (d) receiving the order communication on a second computer, wherein the second computer includes a processor and associated memory, and wherein a second display is communicatively connected to the second computer for viewing the order communication; (e) selecting a link in the order communication to open a requester portal that is accessible on the second computer; (f) inputting account information of the requester into the requester portal; (g) transmitting the requester's account information to the first server via the communications network; (h) transmitting the account information from the first server to at least one account server via an account information communications network, wherein the account information communications network is or includes the communications network or a different communications network; (i) matching the account information received from the first server to transaction data stored on the at least one account server for one or more accounts, wherein the transaction data is stored on the at least one account server; (j) allowing the data relevancy engine to connect to the at least one account server and access the transaction data and aggregating, analyzing, and performing calculations using the transaction data; (k) using the data relevancy engine, producing a report according to a rule, wherein the report is or includes an approved determination or a denied determination in response to a request based on the data relevancy engine's aggregation, analysis, and performance of calculations using the transaction data; and (l) transmitting the report from the server to the first computer via the communications network for viewing on the first display.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

BRIEF DESCRIPTION OF THE DRAWINGS

FIGS. 2A and 2B are a list of rules and rule types used by the systems and methods described herein to generate reports.

DETAILED DESCRIPTION

Figure 1:
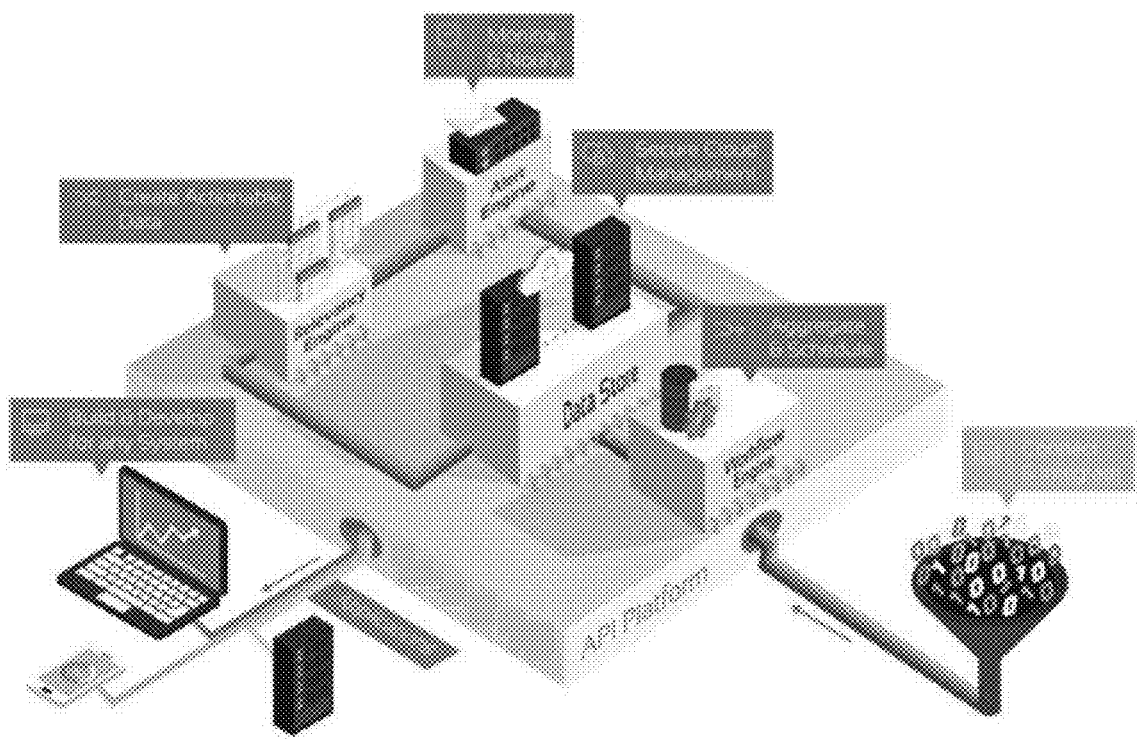
FIG. 1 is a schematic diagram of one embodiment of a computer-implemented system for aggregating and analyzing data contained in a database using relational data queries to create reports and to generate decisions in real-time.

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

The invention provides a system that aggregates and analyzes data contained in a database or in multiple databases. The system can be used to aggregate and analyze data from non-relational sources in relational ways. For example, the system can aggregate and analyze data to produce useful relational reports (for example, reports in tabular format) from non-relational databases. Non-relational databases include those not stored in a tabular format such as, for example, graphs, hosted databases, object databases, document stores, certain tabular databases, multi-model databases, multi-value databases, and key-value stores.

In one exemplary embodiment, the invention features a computer-implemented system for aggregating and analyzing financial data contained in a non-relational database using relational data queries to create financial reports and to generate financial decisions in real-time. The system includes at least one computer having a processor and associated memory and a display communicatively connected to the at least one computer. The computer (also referred to herein as a computing device) can be a desktop computer, a tablet computer, a smart phone (or other mobile phone having a processor, associated memory, and a display), a smart television, or any other computing device capable of connecting to a communications network. The system further includes one or more non-relational databases stored on a server, each of the one or more non-relational databases including consumer data associated with a plurality of consumers. The server can be remote but communicatively connected to the computer via a communications network. The system also includes a relevancy data engine for aggregating and analyzing consumer data of the one or more non-relational databases. The relevancy data engine features an integrated development environment platform for writing a ruleset that includes one or more rules. Each rule features a relational query directed at at least one of the one or more non-relational databases or at other rules of the one or more rules. The relevancy data engine generates one or more reports that are displayed on the display, and the one or more reports include financial data from aggregation and analysis of the consumer data. FIG. 1 shows a schematic presentation of one such exemplary embodiment of a computer-implemented system for aggregating and analyzing data contained in a database using relational data queries to create reports and to generate decisions in real-time.

The system can feature the relevancy data engine being installed and operable on the at least one computer, on the server, or on a second remote server. The data relevancy engine produces metrics that populate reports generated by it using real-time calculations and data analysis using one or more rules, rulesets, or pipeline stages. The data relevancy engine's functions include, but are not limited to, data aggregation, calculations, data pipeline management, and endpoint and data structuring. The data relevancy engine will run a report and aggregate all applicable rulesets under a single master rule and output. For the purposes of data validation, these rules are deployed as individual endpoints that can be used for individual unit testing. Rules and rulesets are created within the data relevancy engine using criteria selected by the user.

A ruleset is created within the data relevancy engine based on predefined criteria that includes calculations and business logic designed to produce a desired output. The accuracy of rulesets can be tested outside of the data relevancy engine to validate that a particular ruleset produces a correct output. The objective of the validation effort is to evaluate the data output integrity of data relevancy engine's rules and rulesets being used to produce the reports. The rule validation testing involves creating controlled datasets, quantifying outputs, and comparing those outputs against results generated by the system.

In one embodiment, the system features a first computer for placing an order and receiving a report, a second computer for linking at least one account to a data relevancy engine, a server on which the data relevancy engine is installed for receiving the order, processing data obtained from at least one linked account, and generating and sending the report based on that data to the first computer. The system also features a communications network (e.g., the Internet, a local area network, or a wide area network) that communicatively connects the first computer and the second computer to the server. The first computer includes a connected or integrated first display for visually displaying information and images. The second computer includes a connected or integrated second display for visually displaying information and images. The system further can further include a second server on which account information related to the at least one account is stored, although in other embodiments, both the data relevancy engine and account information may be installed and stored on the same server.

In this embodiment, a user (e.g., a lender) initiates an order on the first computer via a lender portal (e.g., a website that is accessible via browser software installed and operable on the first computer) or an API integrated in one of the user's existing systems (e.g., another software application used by the user and accessible on the first computer). For example, a rule request (i.e., the order) can be generated for a particular account of a requester (e.g., a bank account that can be identified by a user ID, account ID, account number, or order ID) and a series of rules can be performed to return the inflow, outflow, and leftover cash flow for the requester's account that was the subject of the order. Because the system may be used for purposes other than determining a potential borrower's income, assets, ability to repay, and other borrower-related criteria, the lender portal may also be referred to herein as a user portal. The lender portal or integrated API is viewable on a display that is communicatively connected to the first computer and is capable of receiving and transmitting data. For example, order data can be input into the lender portal or integrated API by the user using a computer-aided data entry device (e.g., a keyboard, a computer mouse or other pointing device, a microphone for receiving voice commands or other audible instructions, or a combination of two or more of the foregoing). Typically, the order data entered by the user using the foregoing means is displayed on the first display, which is communicatively connected to the first computer. In addition to one or more data input fields into which the order data is entered by the user, the lender portal or API includes a submission control that, once activated, transmits the entered order data to the server. The order data includes, at a minimum, an email address, a mobile phone number, a user name or handle for an electronic communication service (e.g., an instant message service), or more than one of the foregoing contact means that is associated with a requester (e.g., a potential borrower or lessee), but in some embodiments, may include additional information such as, for example, a requester name, address, Social Security Number, date of birth, or other personally identifying information of the requester. For purposes of convenience and not as a limitation of the scope of the invention, the "requester" may be referred to herein as a "borrower" with the understanding that, in both instances, one or more persons or entities making a request (as that term is described herein) is intended so that the systems and methods herein are useful for both lending and non-lending purposes as described elsewhere herein. A new order process, which includes software installed on the server, creates an order ID using the order data received from the first computer. After the order ID is created, the new order process creates and sends an order communication, for example, an email containing a link to the email address, a text (e.g., SMS or MMS) message to the mobile phone number, or electronic message (e.g., an instant message), to the user name or handle for the electronic communication service at which the borrower receives communications. The email address, text, or electronic message is receivable by the borrower via the second computer. Order communications may be sent to requesters based on a written (physical or electronic) or verbal request received from a requester or based on contact information for the requester obtained as a lead. The new order process may be a process of and part of the data relevancy engine, or the new order process may be a separate process installed and operable on the server.

In some alternate embodiments, the new order process of the server may generate and send the order communication to the user name or handle for the electronic communication service at which the borrower receives communications without receiving order data from a first computer. In these embodiments, the order data is entered directly onto and resides on the server. In other alternate embodiments, the first computer and the server are a single, unitary, integrated computing device.

The link includes a URL that, when clicked upon or otherwise selected, connects the second computer to a borrower portal, wherein the borrower portal is a web page. Because the system may be used for purposes other than determining a potential borrower's income, assets, ability to repay, and other borrower-related criteria, the borrower portal may also be referred to herein as a requester portal. In other embodiments, the borrower portal is accessible by the borrower via a software application installed and operable on the second computer, e.g., an "app" installed on a mobile phone or smart phone. The borrower portal features one or more account linking fields for receiving account information associated with financial accounts belonging or related to the borrower and an account information submission control (e.g., a "submit" icon or link that causes the borrower portal to transmit information entered into the account linking fields. The borrower enters account information into the account linking fields. Once entered in the account linking fields, the account information is submitted electronically from the second computer via the communications network to the server by clicking on or otherwise selecting the account information submission control. Account information includes, at a minimum, at least one account number associated with the borrower, for example, the borrower's checking account number, savings account number, brokerage account number, retirement account number, loan number, credit card number, debit card number, or other financial account number associated with a financial account belonging or related to the borrower. Account information may also include additional information such as, for example, name on the account, name of financial institution, credit card issuer or network, routing number, security code, expiration date, date of account opening, or other information useful for identifying the account. Additional data can also be submitted by the borrower with the request. Such additional data can include, for example, the borrower's annual income or co-applicant information that is similar to or the same as the types of information submitted by the borrower. Such data can be used to perform for calculations made by the system during the ruleset creation process. After the borrower links one or more of the borrower's accounts to the system through the borrower portal, final data is produced from the account and transaction level datasets retrieved from the borrower's accounts.

Upon transmission to the server from the second computer, the account information is processed by the data relevancy engine, which connects to at least one account server on which transaction data is stored. The data relevancy engine connects to the at least one account server to request the transaction data for an account of the borrow for which transaction data is stored on that account server. For example, if the account information includes an account number for a credit card issued by Bank of America, the data relevancy engine will transmit a request for transaction data to a server controlled by Bank of America to obtain the transaction data associated with that particular account number. The at least one account server receives the request and replies by transmitting the requested transaction data for the relevant account number to the server for processing by the data relevancy engine. In another embodiment, the transaction data may be accessed by the data relevancy engine on the at least one account server and used by the data relevancy engine for performance of the requisite analyses by running rules, rulesets, or pipeline stages, but not downloaded or otherwise transmitted to the server on which the data relevancy engine resides. The server, the at least one account server, or both may have security or authentication processes to ensure that the request is received from the server and not from a hacker or malware-controlled computing device and to ensure that the transaction data is transmitted from the at least one account server to the server and not to a different computing device.

After receiving the transaction data from the at least one account server, the data relevancy engine aggregates the transaction data from each linked account and processes the transaction data by running one or more rules, rulesets, or pipeline stages to generate one or more reports. Examples of rules that may be run by the data relevancy engine on the aggregated transaction data from one or more of the borrower's accounts are provided in FIGS. 2A and 2B. The report (or reports) created by the data relevancy engine are sent electronically to the first computer from the server via the communications network. The user may review the report to make a determination concerning a request by the borrower. Alternatively, the system may include a decision module that automatically produces a determination based on the results included in the report. The request from the borrower can be a request for a loan, a mortgage, other financing, a new checking or savings account, a new brokerage account, a new margin account, approval for various types of trading, a lease (e.g., a lease of a home, apartment, condominium, land, commercial building, automobile, commercial vehicle, or equipment), or any other request for which a review of the borrower's financial records would be required, desirable, or prudent. The determination can be a decision as to whether the borrower request should be approved or denied. As used herein, the "borrower" can be any individual, group of individuals, entity, or group of entities that submit a request through the borrower portal. Although in many instances, the borrower is a person or entity seeking credit, in some embodiments of the system, the borrower is an individual or entity seeking a lease or a new financial account (e.g., a new checking or savings account). If the determination is an approved determination, the user (or the system in automated embodiments) may grant the request of the borrower, and if the determination is a denied determination, the user (or the system) may reject the request. As used herein, the "user" can be a lender or lessor or any other party who places an order through the lender portal in order to receive a report created by the system.

In a different embodiment, rather than transmitting the account information to the server, the second computer may transmit the account information to the at least one account server. After the requester enters the account information into the account linking fields of the requester portal, the account information submission control of the requester portal may be clicked, selected, or otherwise activated to transmit the entered account information from the second computer to the at least one account server as a request. The at least one account server can include a request process that receives the request (which contains the requester's account information), and in response to the request, transmits transaction data related to the accounts specified in the request from their databases stored on the at least one account server to the data relevancy engine of the server for aggregation, analysis, and calculations. In another embodiment, rather than transmitting the transaction data from the at least one account server to the server, the at least one account server may send an alert, notification, or other signal to the server to notify the data relevancy engine that the request has been received and that transaction data pertaining to the request is available for access by the data relevancy engine on the at least one account server.

The database is stored on a server, e.g., on the server of a bank, investment firm, brokerage, or other financial institution. In embodiments of the system having more than one database, each database may be stored on a single server, or the databases may be stored on more than one server. The data stored in the databases, which is aggregated and analyzed by the system, is consumer data, which can include personal information, demographic information, financial information, marketing information, and consumer preference information relating to multiple consumers. The consumer data can include data related to a consumer's bank accounts, credit cards, investments, loans, and bills. For example, in an exemplary embodiment of the system, the consumer data could be stored in a MongoDB server. The consumer data can be stored in NoSQL (also known as non-relational) databases.

As mentioned above, in addition to the consumer data that is stored in a database on a server, the system also includes a relevancy data engine. The relevancy data engine provides a dynamic application program interface (API) that can be used to analyze the consumer data, generate reports based on rule-based queries of the consumer data, and develop marketing initiatives based on those reports. The API can be based on RESTful (Representational state transfer) web services, which will allow the rulesets created using the system to be effective in any MongoDB server environment. The relevancy data engine is designed to permit relational queries of consumer data that is stored in NoSQL databases. By aggregating and analyzing the consumer data, the relevancy data engine is able to generate reports containing financial data that is relevant to consumers and lenders for use in credit decision-making and investment management. The relevancy data engine centralizes this aggregation and analysis even when the databases are stored on more than one server and when such servers are located remotely from one another rather than being located in a single location.

The relevancy data engine is used to create one or more rulesets that include one or more pipeline stages (for example, database queries, JavaScript functions, and other rules) that analyze consumer data stored in databases. The relevancy data engine performs calculations and business, financial, and accounting methodologies and logic in real-time and delivers customized data to software applications used by lenders by drawing upon consumer data stored in the databases (the databases typically being those containing consumer data stored on the servers of financial institutions like banks and brokerage firms). The relevancy data engine includes an integrated development environment (IDE) platform that is used to write the rules of the ruleset. The IDE allows a business analyst, data analyst, data scientist, or other user to define, run, test, debug, and save a series of rules that work together to perform complex data analysis and refinement. As mentioned above, the rules can be used to query a specific dataset within the consumer data that is accessible on the server. This feature of the relevancy data engine includes the ability to create a rule that can query other existing rules.

The system can maintain a library of rules of various types that may be used to generate reports. The data relevancy engine includes three high level rulesets that are used to process order information for downstream calculations, aggregate or combine other ruleset results, and perform final calculations before producing a finished report. The first of these high level rulesets, the main lending rule, contains the output upon which all other rulesets of the system are based as well as some of its own calculations and data aggregation capabilities. Lending metrics, which are another of the high level rulesets, bundle all downstream rules to generate a specified ruleset. Finally, a process order rule is a high level ruleset that pulls all process order information used to process downstream rules. Three types of rules the system utilizes are attribute rules, identify rules, and process rules. Attribute rules create a new dataset that can be shown as an independent result or used in future calculations to produce new datasets. Identify rules are used to identify and extract key data points from a larger dataset. Finally, process rules represent criteria and logic associated with a product ID and also represent individual report parameters and other requirements. Examples of a number of these rules and each rule's type are listed in FIGS. 2A and 2B.

In some embodiments, the data relevancy engine of the system includes a verification of deposit process by which transaction data aggregated from one or more financial institutions at which a borrower has or had accounts is analyzed to perform calculations that identify the borrower's assets including segment deposits, average deposit per segment, and outliers within the segment. The verification of deposit process of the system's data relevancy engine is or can be used to generate a score used by the data relevancy engine to make a determination (i.e., an approved determination or a denied determination) in connection with a request from a borrower.

In some embodiments, the data relevancy engine of the system includes a repayment ability process by which transaction data aggregated from one or more financial institutions at which a borrower has or had accounts is analyzed to perform calculations that determine the borrower's ability repay a loan (or in other cases, to pay rent for a lease). The repayment ability process of the system's data relevancy engine performs these calculations by analyzing the borrower's percentage of net income as compared to the amount of the loan as well as the amount of a loan as a percentage of the borrower's cash flow.

In some embodiments, the data relevancy engine of the system includes an income analysis process by which transaction data aggregated from one or more financial institutions at which a borrower has or had accounts is analyzed to perform calculations that determine a borrower's income. Deposit data within the transaction data is analyzed by matching deposits to the borrower's employer's name or other identifying information, searching for records of direct deposits, matching frequency of deposits, and calculating the borrower's net income. The income analysis process of the data relevancy engine may determine the borrower's net income by identifying credits in the transaction data. Both net income and gross income may also be determined by the data relevancy engine's analysis of multiple accounts associated with the borrower.

In various embodiments of the system, the data relevancy engine may include a verification of deposit process, a repayment ability process, an income analysis process, or two or more of the foregoing. In some embodiments of the system, one or more of the foregoing processes may be separate software applications installed and operated on the server that are not part of the data relevancy engine. In still other embodiments, one or more of the foregoing processes may be separate software applications installed and operated on a second server that is remote from the server on which the data relevancy engine is installed and operated.

The relevancy data engine also handles data verification including negative path capture related to null or zero state negative paths such as verified null states, verified zero state null values, and qualified null states. If a verified null state exists for a particular input to a rule, the system does not run those particular metrics, but instead a "not applicable" or "N/A" result would be provided for those metrics. Such a result refers to information not available or to not enough information being available to obtain an accurate result for the metric.

Verified zero state null values are outputs that are null but represent a valid zero state for purposes of running metrics. As an example, if account activity is 100% verified, but a particular period of time within the verified processed dates time interval results in no credit transactions, this results in a null state. However, this null state is a verified zero credits during that time period.

Depending on the metrics or rules that are being run a qualified null state could be treated as a verified null state or a verified zero state depending on the specific metric being run. A rule for identification of payroll transactions is one example of a rule that could produce qualified null states as a result.

The system can also identify "distortion value" of metrics and rules. Rules that exhibit high distortion values are more susceptible to negative paths (i.e., verified null states, verified zero state null values, and qualified null states) and false positives. Using the system, reports that have no or very low distortion values (i.e., below a predetermined limit) can be provided, while metrics that have high distortion values (i.e., above a predetermined limit) are subject to ongoing veracity testing.

Each time a rule is processed by the system, the results of the rule can be saved in any of several formats. The results of each rule (i.e., query) can be used by the next rule, or by a series of other rules, defined in a ruleset. The system's execution of a final rule in a ruleset produces the financial data in a dataset that is desired by a user as a final output of the system. The financial data is provided in a data interchange format. In one embodiment, the data interchange format can be JavaScript Object Notation (JSON). In other embodiments, the financial data that is the final output may be provided in other formats.

The relevancy data engine can create rulesets that generate markup, rather than data interchange format, as the final output of the system. The markup can be in HTML (hyper text markup language) and CSS (cascading style sheets) that can be obtained from and displayed in a web browser software application. For example, the relevancy data engine can be used to generate a report that provides financial data via relevant financial metrics and calculations advice that are displayed on a website. In this example, the report can render the HTML without any further processing.

Rulesets are constructed by combining multiple individual rules or pipeline stages from within a library or rules and pipeline stages. Nested rulesets can act as a framework that iterates over several stages to define parameters, aggregate or refine datasets, run calculations, and verify data quality. The system can make the final ruleset available as an API endpoint.

In an exemplary embodiment, the relevancy data engine can be developed using Google's Go programming language. In other embodiments, other programming languages may be used.

The system is scalable and can be developed further as necessary to support more complex data analysis. In one example, the system's data relevancy engine can aggregate data that it retrieves from multiple data sources (e.g., from multiple relational databases on one or more servers). This data can be retrieved and aggregated in real-time for use in a ruleset. In another example, the system is capable of processing consumer permissioned data siloed within a database and merge it together with analyses performed with non-permissioned data siloed within a separate database all together.

The system is useful in public financial management for creating and analyzing budgets, cash flow, and categorization and in lending for performing instant account verification, determining a consumer's average balances, and alerting the user to non-sufficient funds when a particular consumer has insufficient funds. The system can also be used in wealth management for ROI (return on investment) projections and other investment analyses. Other areas in which the system may be used are for tracking and analyzing debt payoff and spending, determining fraud risk scores, and monitoring suspicious or fraudulent activity related to consumers or lenders. The system's relevancy data engine can create custom API endpoints based on the user's requirements.

In one example of use of the system for making a lending decision in real-time, a new order is placed by a user (e.g., a lender) using a lender portal (e.g., a web page in a browser software application) accessible online using a computing device connecting to a communications network or via direct API integration in one of the user's existing systems. The order request is received by an order processing module of the system, which sends an order email containing a link to a borrower. The borrower clicks on or otherwise selects the link, which opens a borrower portal (e.g., a web page in a browser software application) that includes data input fields, in which the borrower enters the borrower's account information. The borrower portal also includes a submit icon or other means for submitting the account information entered into the data input fields to a data relevancy engine for processing. Submission of account information via the borrower portal links the borrower's accounts to the data relevancy engine to allow for analysis of the linked accounts for purposes of making a lending decision in real-time. The data relevancy engine processes the order after the borrower submits the borrower's account information using one or more rules, rulesets, or pipeline stages to generate reports based on criteria selected by the user. Data related to the borrower's account information, reports generated therefrom, or both are stored in databases on a server. The report or reports are transmitted to the user for access via the lender portal or via API integrated into the lender's own systems. The user can also submit requests for various reports available for selection using the system and generated by the system using account information gleaned by the system from the user's accounts. The user may also be able to select the format of one or more of the reports.

Methods are also described herein for aggregating and analyzing data contained in a database using relational data queries to create reports and to generate decisions in real-time. Such methods use the systems and devices described herein above and the terms used to describe and explain the following methods have the same meanings as set forth elsewhere herein. These methods include the step of sending an order through a user portal that is accessible on a first computer. The first computer includes a processor and associated memory, and a first display is communicatively connected to the first computer.

These methods also include the step of receiving the order from the first computer on a first server via a communications network that communicatively connects the first computer and the first server. The first server includes a relevancy data engine, and the order includes contact means (e.g., an email address, mobile phone number, user name or handle for an electronic communication service, or other contact means as described herein) related to a requester. These methods also include the step of sending an order communication via the communications network from the first server to the contact means provided in the order for the requester.

These methods also include the step of receiving the order communication on a second computer. The second computer includes a processor and associated memory, and a second display is communicatively connected to the second computer for viewing the order communication. These methods also include the step of selecting a link in the order communication to open a requester portal that is accessible on the second computer. These methods also include the steps of inputting account information of the requester into the requester portal, and transmitting the requester's account information to the first server via the communications network.

These methods also include the step of transmitting the account information from the first server to at least one account server via an account information communications network. The account information communications network is or can be the communications network or a different communications network.

These methods also include the step of matching the account information received from the first server to transaction data stored on the at least one account server for one or more accounts. The transaction data is stored on the at least one account server. These methods also include the step of allowing the data relevancy engine to connect to the at least one account server and access the transaction data and aggregating, analyzing, and performing calculations using the transaction data.

These methods also include the step of using the data relevancy engine to produce a report according to a rule. The report can include calculation results, data generated by the data relevancy engine during aggregation and analysis of the transaction data, and an approved determination or a denied determination in response to a request based on the data relevancy engine's aggregation, analysis, and performance of calculations using the transaction data.

These methods may also include the step of transmitting the report from the server to the first computer via the communications network for viewing on the first display. The user may view the report and decide to accept or reject the system's approved determination or denied determination, as the case may be, with respect to the requester's request.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A computer-implemented system for aggregating and analyzing data contained in a database using relational data queries to create reports and to generate decisions in real-time, the system comprising:
   a first computer comprising a processor and associated memory, wherein a user portal is accessible on the first computer;
   a first display communicatively connected to the first computer;
   a first server comprising a new order process and a relevancy data engine, wherein the new order process sends an order communication;
   a second computer for receiving the order communication from the first server, wherein the second computer comprises a processor and associated memory, and wherein a requester portal is accessible on the second computer;
   a second display communicatively connected to the second computer for viewing the order communication; and
   a communications network for communicatively connecting the first computer and the second computer to the first server;
   wherein the order communication is selectable to access the requester portal on which account information of a requester is inputtable and transmittable as a request;
   wherein the relevancy data engine transmits the account information to at least one account server to access transaction data stored in one or more databases on at least one account server;
   wherein the transaction data is related to the requester whose account information was input into the requester portal;
   wherein the relevancy data engine connects to the at least one account server via the communications network or via a second communications network;
   wherein the relevancy data engine produces a report comprising an approved determination or a denied determination in response to the request;
   wherein the relevancy data engine aggregates and analyzes transaction data stored in the one or more databases to produce the report according to a rule; and
   wherein the relevancy data engine transmits the report to the first computer for viewing on the first display.

2. The system of claim 1, wherein the report further comprises financial data and results of calculations performed by the data relevancy engine by aggregation and analysis of the transaction data.

3. The system of claim 1, wherein the at least one account server comprises a financial institution server owned, operated, or controlled by a financial institution; and wherein the at least one account server comprises an authentication and security process to authenticate that the request received by the at least one account server is from the first server before access to the transaction data is granted to the first server by the at least one account server.

4. The system of claim 1, wherein the rule comprises a single rule, a ruleset comprising more than one rule, or a pipeline stage.

5. The system of claim 1, wherein the one or more databases on the at least one account server are non-relational databases.

6. The system of claim 1, wherein the account information comprises an account number or other account-identifying information related to a checking account, savings account, brokerage account, retirement account, loan, mortgage, margin account, credit card account, or other type of financial account of the requester.

7. The system of claim 1, wherein the transaction data comprises records of credits and debits related to one or more accounts, which are stored in the one or more databases on the at least one account server.

8. The system of claim 1, wherein the request comprises the requester's request for credit, a loan, a new financial account, insurance, or a lease.

9. The system of claim 5, wherein the rule comprises a relational data query run by the data relevancy engine using transaction data, which is non-relational, obtained from the one or more non-relational databases stored on the at least one account server; and wherein the data relevancy engine aggregates, analyzes, and performs calculations using the non-relational transaction data to create a report and to make the approved determination or the denied determination in real-time in response to the request.

10. A computer-implemented system for aggregating and analyzing data contained in a database using relational data queries to create reports and to generate decisions in real-time, the system comprising:
- a first computer comprising a processor and associated memory, wherein a user portal is accessible on the first computer;
- a first display communicatively connected to the first computer;
- a first server comprising a new order process and a relevancy data engine, wherein the new order process receives an order from the first computer and sends an order communication;
- a second computer for receiving the order communication from the first server, wherein the second computer comprises a processor and associated memory, and wherein a requester portal is accessible on the second computer;
- a second display communicatively connected to the second computer for viewing the order communication;
- at least one account server on which transaction data related to at least one account of a requester is stored in a database; and
- a communications network for communicatively connecting the first computer, the second computer, and the at least one account server to the first server;
- wherein the order communication is selectable to access the requester portal on which account information of the requester is inputtable and transmittable as a request;
- wherein the relevancy data engine transmits the account information to at least one account server to access the transaction data stored in one or more databases on the at least one account server;
- wherein the transaction data is related to the requester whose account information was input into the requester portal;
- wherein the relevancy data engine connects to the at least one account server via the communications network or via a second communications network;
- wherein the relevancy data engine produces a report comprising an approved determination or a denied determination in response to the request;
- wherein the relevancy data engine aggregates and analyzes transaction data stored in the one or more databases to produce the report according to a rule; and
- wherein the relevancy data engine transmits the report to the first computer for viewing on the first display.

11. The system of claim 10, wherein the report further comprises financial data and results of calculations performed by the data relevancy engine by aggregation and analysis of the transaction data.

12. The system of claim 10, wherein the at least one account server is remote from the first server on which the data relevancy engine is installed.

13. The system of claim 10, wherein the rule comprises a single rule, a ruleset comprising more than one rule, or a pipeline stage.

14. The system of claim 10, wherein the one or more databases on the at least one account server are non-relational databases.

15. The system of claim 10, wherein the at least one account server comprises a financial institution server owned, operated, or controlled by a financial institution; and wherein the at least one account server comprises an authentication and security process to authenticate that the request received by the at least one account server is from the first server before access to the transaction data is granted to the first server by the at least one account server.

16. The system of claim 10, wherein the account information comprises an account number or other account-identifying information related to a checking account, savings account, brokerage account, retirement account, loan, mortgage, margin account, credit card account, or other type of financial account of the requester.

17. The system of claim 10, wherein the transaction data comprises records of credits and debits related to one or more accounts, which are stored in the one or more databases on the at least one account server.

18. The system of claim 10, wherein the request comprises the requester's request for credit, a loan, a new financial account, insurance, or a lease.

19. The system of claim 14, wherein the rule comprises a relational data query run by the data relevancy engine using transaction data, which is non-relational, obtained from the one or more non-relational databases stored on the at least one account server; and wherein the data relevancy engine aggregates, analyzes, and performs calculations using the non-relational transaction data to create a report and to make the approved determination or the denied determination in real-time in response to the request.

20. A method for aggregating and analyzing data contained in a database using relational data queries to create reports and to generate decisions in real-time, the method comprising the steps of:
- (a) sending an order through a user portal accessible on a first computer, wherein the first computer comprises a processor and associated memory, and wherein a first display is communicatively connected to the first computer;
- (b) receiving the order from the first computer on a first server via a communications network that communicatively connects the first computer and the first server, wherein the first server comprises a relevancy data engine, and wherein the order comprises contact means related to a requester;
- (c) sending an order communication via the communications network from the first server to the contact means provided in the order for the requester;
- (d) receiving the order communication on a second computer, wherein the second computer comprises a processor and associated memory, and wherein a second display is communicatively connected to the second computer for viewing the order communication;
- (e) selecting a link in the order communication to open a requester portal that is accessible on the second computer;
- (f) inputting account information of the requester into the requester portal;
- (g) transmitting the requester's account information to the first server via the communications network;
- (h) transmitting the account information from the first server to at least one account server via an account information communications network, wherein the account information communications network comprises the communications network or a different communications network;
- (i) matching the account information received from the first server to transaction data stored on the at least one account server for one or more accounts, wherein the transaction data is stored on the at least one account server;
- (j) allowing the data relevancy engine to connect to the at least one account server and access the transaction data and aggregating, analyzing, and performing calculations using the transaction data;

(k) using the data relevancy engine, producing a report according to a rule, wherein the report comprises an approved determination or a denied determination in response to a request based on the data relevancy engine's aggregation, analysis, and performance of calculations using the transaction data; and (l) transmitting the report from the server to the first computer via the communications network for viewing on the first display.

\* \* \* \* \*